United States Patent [19]

Hammell et al.

[11] Patent Number: 5,471,433

[45] Date of Patent: Nov. 28, 1995

[54] SYSTEM AND METHOD FOR RAPIDLY TRACKING HIGHLY DYNAMIC VEHICLES

[75] Inventors: Sherry E. Hammell, Little Compton; Kai F. Gong, Pawtucket; Neil A. Jackson, North Kingston, all of R.I.; Kathleen D. Keay, Fairhaven; John F. MacDonald, Westport, both of Mass.

[73] Assignee: The United States of America as represented by the Secretary of the Navy, Washington, D.C.

[21] Appl. No.: 324,638

[22] Filed: Oct. 18, 1994

[51] Int. Cl.⁶ .............................. G01S 15/66; G01S 15/58
[52] U.S. Cl. .......................... 367/118; 367/124; 367/127; 367/131
[58] Field of Search ...................... 367/118, 124, 367/127, 131; 364/516, 462, 460, 423; 342/195, 107

[56] References Cited

U.S. PATENT DOCUMENTS 3,996,590  12/1976  Hammack ................. 342/107

Primary Examiner—Daniel T. Pihulic
Attorney, Agent, or Firm—Michael J. McGowan; Michael F. Oglo; Prithvi C. Lall

[57] ABSTRACT

A trajectory estimation system for estimating a trajectory of a target in response to a series of data items which generated in response to motion of the target. The trajectory estimation system includes a data segmentation means and a trajectory selection means. The data segmentation means processes the series of data items in accordance with a regression/multiple-hypothesis methodology to generate a plurality of segments, each having associated data items which have similar features. The trajectory selection means for processing said segments in accordance with a multiple-model hypothesis methodology to generate a corresponding statistically-supportable candidate trajectory motion estimate of target motion thereby to provide indicia of an overall trajectory of the target.

7 Claims, 5 Drawing Sheets

SYSTEM AND METHOD FOR RAPIDLY TRACKING HIGHLY DYNAMIC VEHICLES

STATEMENT OF GOVERNMENT INTEREST

The invention described herein may be manufactured by or for the Government of the United States of America for Governmental purposes without the payment of any royalties thereon or therefor.

CROSS-REFERENCE TO RELATED APPLICATIONS

This patent application is co-pending with related patent application Ser. No. 08/324,639 filed on Oct. 18, 1994 entitled SYSTEM AND METHOD FOR RAPIDLY TRACKING VEHICLES OF SPECIAL UTILITY IN LOW SIGNAL-TO-NOISE ENVIRONMENTS, Navy Case No. 76256 by the same inventors as this application.

BACKGROUND OF THE INVENTION

1. Field of the Invention

The invention relates generally to the field of signal processing and more particularly to a system and method for rapidly detecting a moving target and determining its movement characteristics, such as range, bearing, speed and course in a noisy environment.

2. Description of the Prior Art

Detection of a moving object, such as a target, and determination of its range, bearing, speed and course in an ocean environent, is a difficult task, particularly if the target is moving relatively noiselessly and it is desired to perform the detect as early as possible. Typically, acoustic sensors are used to detect acoustic energy (sound waves) emitted by a moving object and convert such energy to electrical signals, and complex signal processing operations are performed in connection with the electrical signals to isolate and provide the desired information. An ocean environment is generally very noisy, and so low-level acoustic signals typical of quietly-moving targets and the high level of ambient noise joint to provide a relatively low ratio of desired signal-to-noise in the electrical signal provided by the sensor, which makes early and accurate detection quite difficult. In current systems, signals that do not have a signal-to-noise ratios above a selected predetermined threshold value are ignored, in which case such signals are not available to provide information which may potentially be useful in characterising the motion of the target.

SUMMARY OF THE INVENTION

It is therefore an object of the invention to provide a new and improved system and method for rapidly tracking moving objects in a noisy environment.

In brief summary, the invention provides a trajectory estimation system for estimating a trajectory of a target in response to a series of data items which generated in response to motion of the target. The trajectory estimation system includes a data segmentation means and a trajectory selection means. The data segmentation means processes the series of data items in accordance with a regression/multiple-hypothesis methodology to generate a plurality of segments, each having associated data items which have similar features. The trajectory selection means for processing said segments in accordance with a multiple-model/hypothesis methodology to generate a corresponding statistically-supportable candidate trajectory motion estimate of target motion thereby to provide indicia of an overall trajectory of the target.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1A:
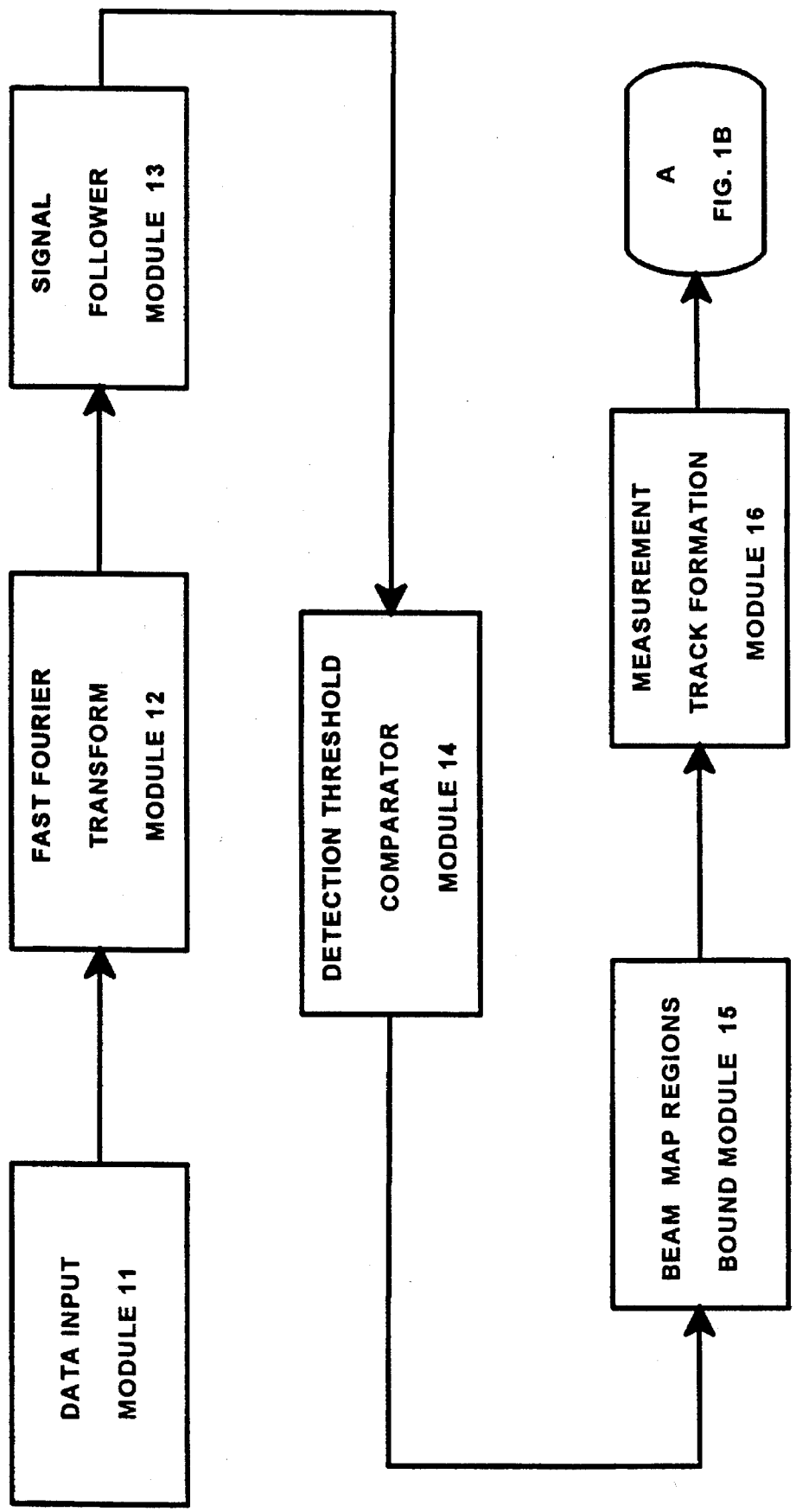
FIGS. 1A and 1B together constitute a functional block diagram of a system constructed in accordance with the invention.
Figure 1B:
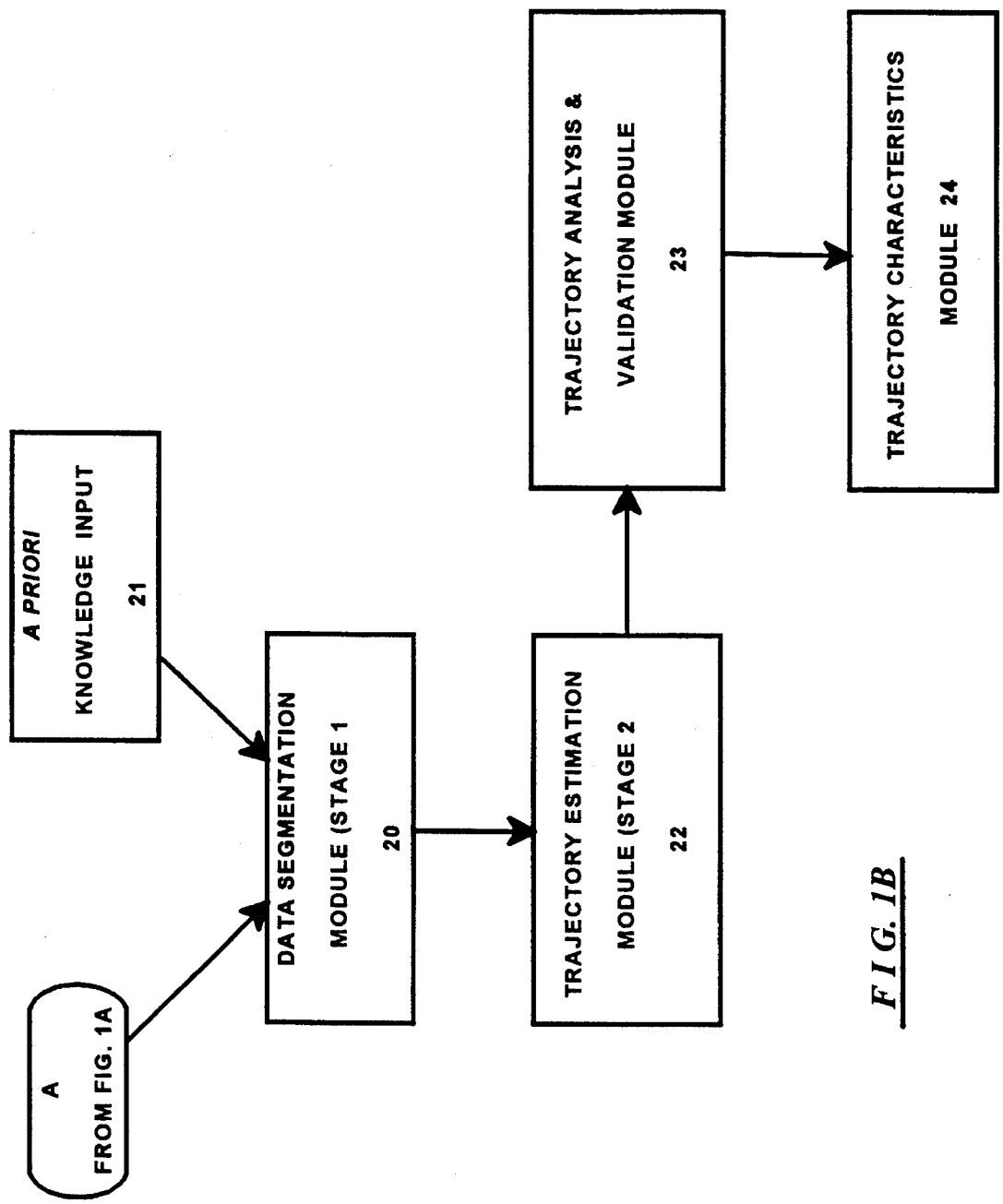

FIGS. 1A and 1B together constitute a functional block diagram of a system 10 for rapidly tracking highly dynamic vehicles, constructed in accordance with the invention. With reference to FIG. 1A, the system 10 includes a sensor arrangement 11 that receives acoustic energy (sound) in the form of signals from, for example, an ocean environment, converts the signals to electrical form, and records the electrical signals for later processing. A fast Fourier transform arrangement 12 performs a conventional fast Fourier transform (FFT) operation in connection with the recorded signals to thereby generate phase and amplitude spectral beam maps for the signals. A signal follower module 13 receives the beam maps from the fast Fourier transform arrangement 12 for signals at successive points in time and determines whether the beam map indicates that the signal-to-noise ratio of the signal as provided by the sensors 11 exceeds a predetermined detection threshold value, thereby to determine when the signals represent signals from a particular target and effectively distinguising such target signals from environmental and other noise.

When the signal follower 13 determines that a beam map from the fast Fourier transform arrrangement 12 exceeds the predetermined detection threshold value, a detection threshold comparator 14 compares the beam map corresponding to the signal at detection to the beam map immediately prior to detection (that is, for the last beam map from the fast Fourier transform arrangement 12 that did not exceed the predetermined detection threshold value) to detect similarities. A beam regions bound module 15 receives the beam maps and similarity information, and bounds the beam maps based on a priori information, such as kinematic and other information known about likely targets. The detection threshold comparator 14 and beam regions bound module 15 repeat the operations with each beam map recorded by the sensor arrangement 11 prior to the signal follower 13 determining that a signal exceeded the signal-to-noise threshold value. This allows the detection threshold comparator 14 and the beam regions bound module 15 to obtain information concerning the target from the signals recorded prior to detection (that is, prior to the signal follower module 13 determining that a signal exceeded the signal-to-noise threshold value), so that the system 10 will not have to rely solely on signals received after such time. In addition, the system 10 facilitates a restriction on the number of signals that it will have to analyze and allow for subsequent information to be recorded at signal-to-noise ratios lower than the detection threshold values. In particular, a measurement track formations module 16 receives the information from the beam map bounds module and applies a lower signal-to-noise ratio threshold value than that applied by the signal follower module 13 to the beam maps recorded by the sensor arrangement prior to signal detection as determined by the signal follower module 13. The measurement track formations module 16 repeats these operations through a series of iterations, in each iteration applying a lower signal-to-noise ratio than in the previous iteration, to extract signal information from the background noise and clutter in those beam maps. For each of the beam maps that satisfy the signal-to-noise criteria for each of the iterations, the measurement track formations module 16 performs an inverse fast Fourier transform operation to transform the bounded beam maps to provide a time-based signal for later processing.

The signal information from the measurement track formations module 16 is then used by a data segmentation module 20 (FIG. 1B) and a trajectory estimation module 22 (FIG. 1B) to determine the range, bearing, speed and course of the target which is the source of the signal. The operations of the data segmentation module 20 and the trajectory estimation module will be described below in detail in connection with FIGS. 2A and 2B (the data segmentation module 20) and FIG. 3 (the trajectory estimation module 22). Briefly, however, the data segmentation module 20 receives the signal information from the measurement track formations module 16 and, using that information and a priori kinematic and other knowledge concerning likely targets from a priori knowledge input 21, generates one or more hypotheses regarding movement of the target. The trajectory estimation module 22 receives the hypotheses and selects one as the most likely hypothesis, effectively selecting the most likely trajectory (range and bearing) of the target. The trajectory that is selected is verified by a trajectory analysis and validation module 23 and a trajectory characteristics module 24 using conventional statistical measures testing the likelihood or probability that a trajectory is representative of the information contained in the signals received by the sensor arrangement 11.

As noted above, the data segmentation module 20 (FIG. 1B) generates a set of hypotheses $H_{ij}$ each containing one or more segments $S_j$. Each segment $S_j$ is a hypothesized line segment that the data segmentation module 20 generates in response to the signal information, represented by a series of data items, that the data segmentation module 20 receives from the measurement track formations module 16. The data segmentation module 20 generates the segments $S_j$ in a series of iterations for each successive data item it receives. In each iteration, the data segmentation module 20 effectively attempts to add the data item to each segment $S_j$ that it had initiated during previous iterations, and generates a likelihood measure indicating the likelihood that the data item actually belongs to each of the segments $S_j$. In addition during each iteration, the data segmentation module 20 initiates a new segment $S_N$ containing only the new data item, for the possibility that the data item is the first data item of a segment, and generates a likelihood measure indicating the likelihood that the data item is the first data item for a new segment; in each subsequent iteration, the new segment will be used along with other segments initiated during previous iterations as possible segments for subsequent data items. In addition, during each iteration the data segmentation module generates a "false alarm" hypothesis $H_{iFA}$ for the possibility that the data item does not belong to any segment. The trajectory estimation module 22 prunes the hypotheses and the various segments, and over a series of iterations, the data segmentation module 20 and trajectory estimation module 22 cooperate to narrow the hypothesized segments $S_j$.

Figure 2A:
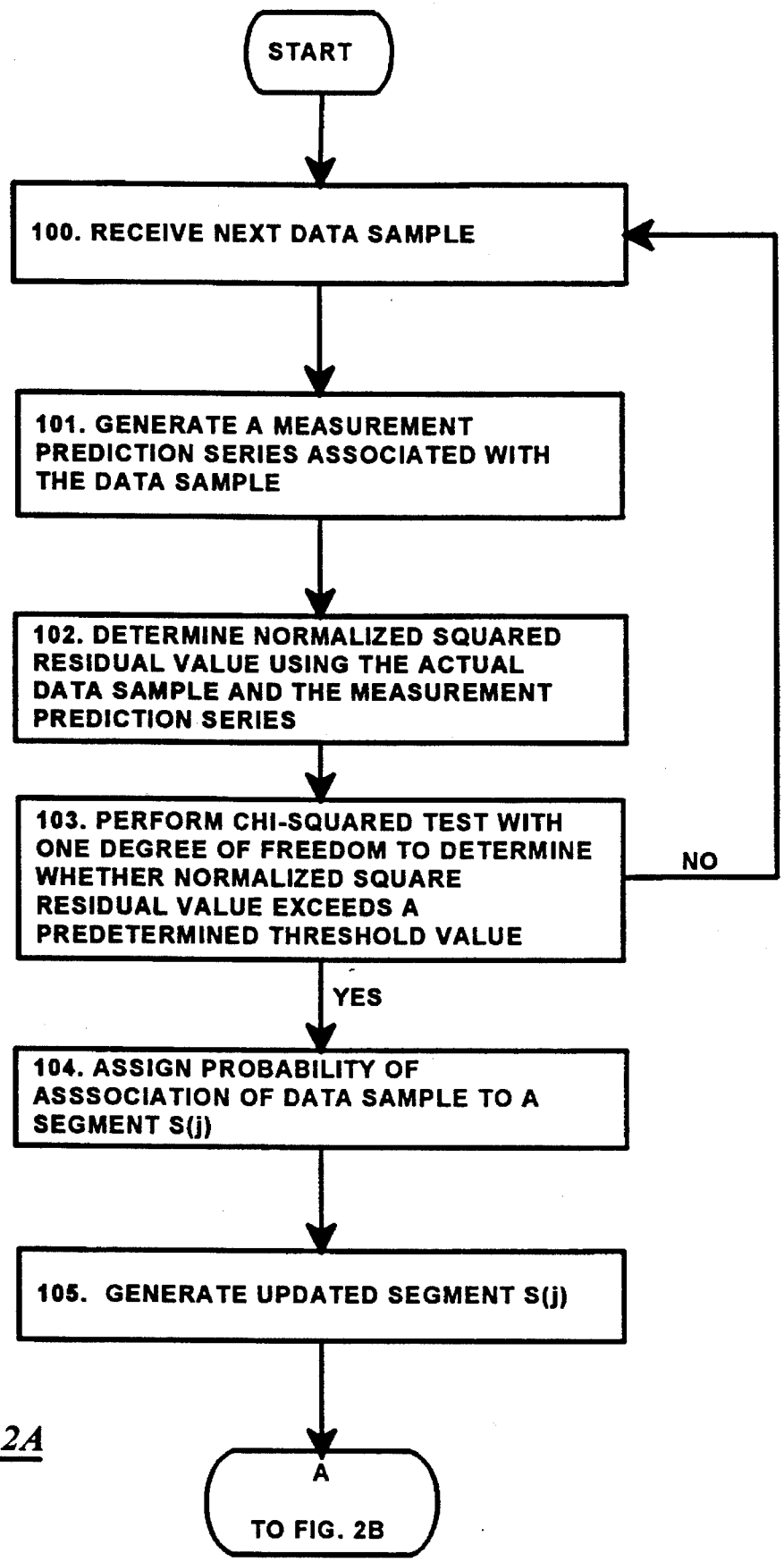
FIGS. 2A through 3 comprise flow diagrams illustrating the operation of the system depicted in FIGS. 1A and 1B.
Figure 2B:
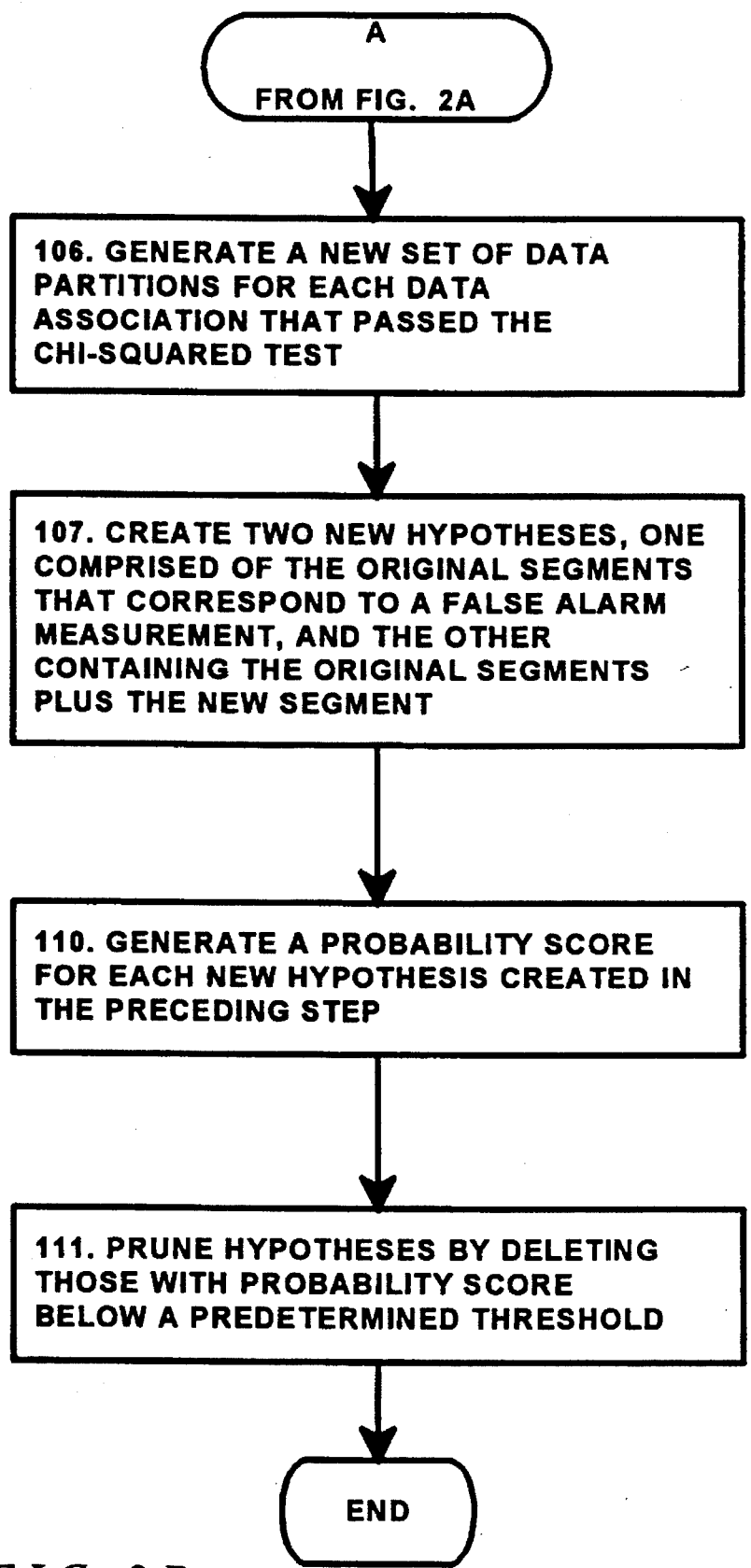
Figure 3:
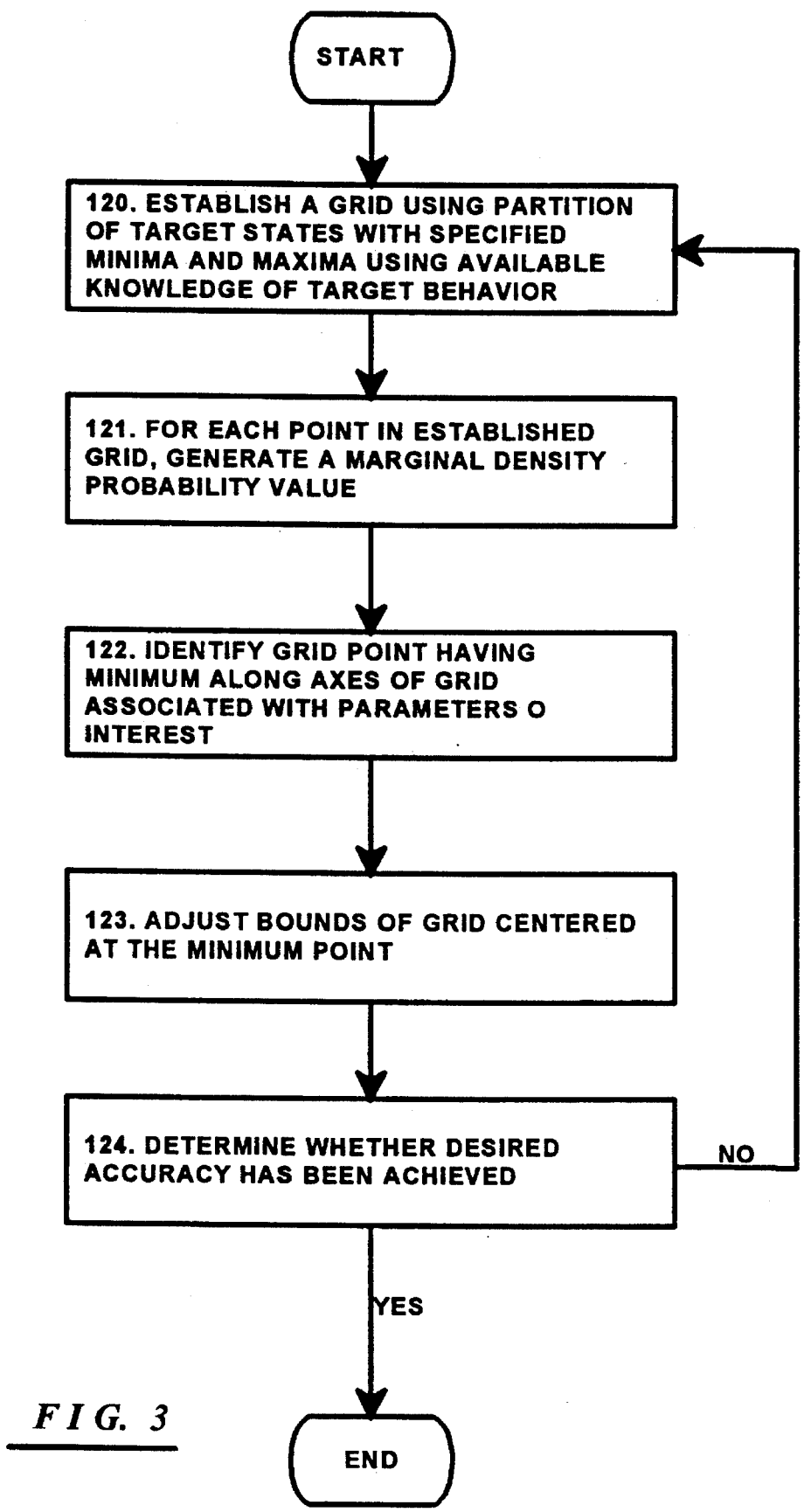

The operations performed by the data segmentation module 20 and the trajectory estimation module 22, each during one iteration, are depicted in FIGS. 2A, 2B (data segmentation module 20, and FIG. 3 (trajectory estimation module 22). With reference initially to the data segmentation module 20, the data segmentation module 20 represents each segment as a reduced set of regression coefficients, or "features" in the signal represented by the data stream. With further reference initially to FIG. 2A., upon receiving a new data item, identified herein as "$z_1(t)$" (step 100), the data segmentation module initially performs a series of steps 101 through 103 to test the statistical consistency of the data item $z_1(t)$ with each segment $s_j$.

In determining the statistical consistency, if it is assumed that a segment $S_j$ consists of "n" data items previously assigned to the segment $S_j$, the data segmentation module 20 initially forms a predicted data item value $\hat{z}_1(t/n)$ as set forth in Equation 1:

$$\hat{z}_1(t) = a_0(t^*) + a_1(t^*) + \frac{1}{2} a_2(t^*) \frac{(t-t^*)^2}{2} \quad (1)$$

where $a_i(t^*)$ are the i'th time derivatives of the measurement $z_1(t)$ evaluated at time $t^*$ (step 101). In this case, the data segmentation module 20 uses $t^*$ as the midpoint of the successive data intervals for the successive data items to minimize estimation errors for the regression operation.

After generating the predicted data item value $\hat{z}_1(t/n)$ via equation (1), the data segmentation module 20 generates a normalized squared residual value (step 102) as $$\hat{r}(t/n) = [z_1(t) - \hat{z}_1(t/n)]^T c(t/n) [z_1(t) - \hat{z}_1(t/n)] \quad (2)$$

and performs a chi-squared test in connection with $\hat{r}(t/n)$ to determine whether it satifies a threshold "gating" value (step 103), which in one embodiment is set to the value thirty-six. If the data segmentation module 20 makes a negative determination in step 103, it will ignore the data item received in step 100, and will returns to step 100 to repeat the operations in steps 101 through 103 in connection with the next data item.

If, on the other hand, the data segmentation module 20 makes a positive determination in step 103, it assigns a probability value $P_a(S_j)$ identifying the likelihood that the new data item belongs to segment $S_j$ (step 104), and generates an updated segment $S_j'$ including the new data item (step 105). The data segmentation module 20 generates the probability value $P_a(S_j)$ as a function of the normalized squared residual value generated i step 102 prior to the chi-squared test, in a conventional manner. In one embodiment, for simplicity the probability assignment is obtained by mapping the normalized squared residual (equation 2) in an intuitive formula that approximates the complement of the chi-squared distribution as follows $$P_a(S_j) = \begin{cases} 1 - \frac{\hat{r}(t/n)}{36} & \text{for } \hat{r}(t/n) < 36 \\ 0 & \text{otherwise} \end{cases} \quad (3)$$

The data segmentation module 20 generates the updated segment $S_j'$ to include the new data item (identified as the "n+1"st data item) in the following manner. Given a value $a(t_n^*)$ as the current endpoint of segment $S_j$, the data segmentation module 20 generates a new endpoint $a(t_{n+1}^*/n+1)$ for the data item $z_1(t)$ as $$a(t_{n+1}^*/n+1) = a(t_{n+1}^*/n) + K(n)[z_1(t) - \hat{z}_1(t/n)] \quad (4)$$

where $$a(t_{n+1}^*/n) = A(t_{n+1}^*, t_n^*) \, a(t_n^*/n) \quad (5)$$

and $$A(t_{n+1}, t_n) = \begin{bmatrix} 1 & (t_{n+1} - t_n) & \frac{1}{2}(t_{n+1} - t_n)^2 \\ 0 & 1 & (t_{n+1} - t_n) \\ 0 & 0 & 1 \end{bmatrix} \quad (6)$$

The new endpoint, together with the points previously assigned to the segment $S_j$, defines an updated segment $S_j'$. The data segmentation module 20 determines the Kalman gain $K(n)$ for equation 3 as $$K(n) = R(t_{n+1}*/n) H(t, t_{n-1}*) c(t/n) \quad (7)$$

with $$c(t/n) = [H(t, t_n*) R(t_n*) H(t, t_n*)^t + \sigma^2]^{-1} \quad (8)$$

and $$H(t, t_n*) = [1 (t-t*)] \quad (9)$$

and the corresponding covariance matrix of $a(t_{n+1}*/n+1)$ is $$R(t_{n+1}*/n+1) = [I - K(n) A(t_{n+1}*, t_n*)^T] R(t_{n+1}*/n) \quad (10)$$

where $$R(t_{n+1}*/n) = A(t_{n+1}*, t_n*) R(t_n*/n) A(t_{n+1}*, t_n*)^T \quad (11)$$

and "I" is the three-by-three identity matrix.

After generating the updated segments $S_j'$ for all segments for which the chi-squared test was satisfied in step 103, the data segmentation module 20 effectively updates the set of hypotheses $H_i$. In that process, the data segmentation module 20 updates hypotheses $H_{ij}$ developed during previous iterations, in connection with previous data items in the series, replacing the segments $S_j$ in the respective hypotheses with updated segments $S_j'$ (step 106). In addition, the data segmentation module 20 establishes two new hypotheses, one hypothesis $H_{iFA}$ comprised of the original segments and the other hypothesis $H_{iN}$ comprised of the orignal segments plus a new segment $S_N$ representing the new data item. The hypothesis $H_{iFA}$, since it contains only the original, non-updated segments, represents the likelihood that the new data item is a "false alarm", that is, that it neither belongs to any segment $S_j$ nor is the first data item of a new segment $S_N$. The hypothesis $H_{iN}$, on the other hand, represents the likelihood that the new data item is the first data item of a new segment $S_N$ and that the other segments $S_j$ are incorrect hypotheses.

The data segmentation module 20 then proceeds to a series of steps to generate several likelihood scores for each hypothesis. In particular, the data segmentation module generates a raw likelihood score $P(H_i/n+1)$ for the original (non-updated) hypotheses $H_i$ as (12)

$$P(H_i/n+1) = P(H_i/n)\left[\left(1 - \prod_{j=1}^{K} 1 - P_a(S_j)\right)(1-P_N)(1-P_{FA}) + P_N(1-P_{FA}) + P_{FA}\right]$$

where "$P_N$" represents the a priori likelihood that the data item $z_1(t)$ starts a new segment, "$P_{FA}$" represents the a priori likelihood that data item $z_1(t)$ is a "false alarm," that is that, it does not belong to any segment, and "K" is the number of segments $S_j$ in the collection of segments in hypothesis $H_i$. The a priori likelihood values are provided by the a priori knowledge input module 21, and are generated in any conventional manner. The data segmentation module 20 then, for each hypothesis $H_i$ in the collection of hypotheses H updated in step 106, generates likelihood scores for a series of hypotheses $H_{ij}$, where each hypothesis $H_{ij}$ corresponds to the collection of segments in hypothesis $H_i$, but replacing the original of segment $S_j$ with the updated segment $S_j'$, as well as for the hypotheses $H_{iN}$ and $H_{iFA}$ as (step 110). In those operations, the data segmentation module 20 18 generates the likelihood score $P(H_{ij})$ for each hypothesis $H_{ij}$ as $$P(H_{ij}) = P(H_i/n+1) \frac{\left[1 - \prod_{j=1}^{K}(1 - P_a(S_j))\right](1-P_{FA}) \frac{P_a(S_j)}{1 - P_a(S_j)}}{\sum_{j=1}^{K}(1 - P_a(S_j))}, \quad (13)$$

the likelihood score $P(H_{iN})$ for the augmented hypothesis $H_{iN}$ (that is, the hypothesis that the data item is the first data item for a new segment) as:

$$P(H_{iN}) = P(H_i/n+1)\left[\prod_{j=1}^{K}(1 - P_a(S_j))\right](I - P_{FA}), \quad (14)$$

and the likelihood score $P(H_{iFA})$ for false-alarm hypothesis $H_{iFA}$ as $$P(H_{iFA}) = (H_i/n+1) P_{FA} \quad (15).$$

After generating the likelihood scores, the data segmentation module 20 prunes the hypotheses $H_{ij}$, $H_{iN}$ and $H_{iFA}$ by deleting the hypotheses that have likelihood scores below a predetermined threshold value (step 111). The data segmentation module prunes a segment $S_j$, that is, it completely eliminates the segment, when the segment is no longer contained in any hypothesis $H_{ij}$ for any index "i".

After performing steps 100 through 111 for one data item, the data segmentation module 20 returns to step 100 to process the next data item. The data segmentation module 20 performs steps 100 through 111 for each data item representing a signal it receives from the measurement track formation module 16.

After generating the hypotheses $H_i$ for a set of data items, the data segmentation module 20 then transfers the set of pruned segments $S_j$ contained in the hypotheses $H_{ij}$ and $H_{iN}$ to the trajectory estimation module 22. The trajectory estimation module 22 then performs a discrete grid search procedure depicted in FIG. 3 in connection with all of the segments $S_j$ to select one segment $S_j$ as being most representative of the information represented by the data items. With reference to FIG. 3, the trajectory estimation module 22 uses as the various target variables representing the target states such target variables as range "r", bearing "b", speed "s", course "c" and course rate "c", and establishes a series of "bins" with the minimum and maximum values for each of these variables as determined from a priori knowledge of the possible target (step 120). The result, if the target variables r, b, s, c and c are considered to form a five-dimensional space, is a five-dimensional grid of a size determined by the minimum and maximum values for each variable.

In selecting a segment $S_j$ as the potentially correct segment, the trajectory estimation module 22 makes the determination based on certain ones of the variables, as indicated by the nature of the particular data items, in this case range "r" and bearing "b". After the grid is established, for each discrete point in the grid, the trajectory estimation module 22 generates a marginal density value $P_{ij}$ (step 121) along the coordinates "i" and "j" of these data items as $$P_{ij} = \sum_{klm} e^{-\frac{1}{2} |z - z(r_i, b_j, s_k, c_l, c_m)|^2} \quad (16)$$

The trajectory estimation module 22 then identifies the point (i,j) at which the marginal density value is a minimum (step 122), and adjusts the perspective of the grid so that it is centered over that point (123). The trajectory estimation module 22 determines whether a selected accuracy level, as determined by the resolution of the grid generated by the trajectory estimation module 22, has been reached (step 124), and if not returns to step 120 to repeat the operations. The trajectory estimation module 22 repeats the operations until the selected accuracy level has been reached, and if so it performs a chi-squared test in connection with the segment $S_j$. It will be appreciated that the trajectory estimation module 22 will perform these operations in connection with all of the segments $S_j$, and it will use the results of the chi-squared tests for all of the segments to identify one as being most representative of the data, and that segment is selected as the correct one.

As noted above, and returning to FIG. 1B, the segment selected by the trajectory estimation module 22 is coupled to a trajectory analysis and validation module 23 and a trajectory characteristics module 24 for verification using conventional statistical measures testing the likelihood or probability that a trajectory is representative of the information contained in the signals received by the sensor arrangement 11.

The invention provides a number of advantages. It facilitates the detection and use of use of signals received that are below the (initial) signal-to-noise ratio, despite the fact that such signals are embedded in an increased level of clutter and noise. This enables the system to determine the location and bearing of a target relatively early and quickly.

In addition, the invention provides an arrangement for quickly and reliably tracking a target with an environmentally perturbed minimal data set comprising only a few data items which exploits target kinematics and a priori knowledge, which further allows for anomolies in the data. Using multiple hypothesis techniques, such as as described in connection with the data segmentation module 20 and the trajectory estimation module 22 (FIGS. 2A, 2B and 3) allows for accommodation of changes in dynamics and quik evaluation of the target dynamics. The segmentation of acoustical information, as performed by the data segmentaiton module 20, allows for partitioning of the data according to similar features, which, in turn, allows for rapid detection of motion changes. The discrete grid search technique performed by the trajectory estimation module 22 provides for relative stability in the non-linear estimation problem and exploitation of a priori knowledge of target motion.

It will be appreciated by those skilled in the art that the new arrangement can be implemented using special-purpose hardware or a suitably-programmed general purpose computer.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A trajectory estimation system for estimating a trajectory of a target in response to a series of data items which generated in response to motion of the target, said trajectory estimation system comprising:

data segmentation means for processsing the series of data items in accordance with a multiple-hypothesis regression methodology to generate a plurality of segments, each having associated data items which have similar features; and trajectory selection means for processing said segments in accordance with a multiple-model hypothesis methodology to generate a corresponding statistically-supportable candidate trajectory motion estimate of target motion thereby to provide indicia of an overall trajectory of the target.

2. A system as defined in claim 1 in which said data segmentation means includes:

sample prediction means for generating, for a newly-received data sample and for each of a plurality of previously established samples, a prediction series representing an expected data sample value;

sample probability means for generating, for each previously-established data segment, a likelihood value representing the likelihood that the newly-received data sample is a component of the previously-established data data segment, in response to the exepected data sample values and the data sample, hypothesis update means for updating the previously-established segments for each previously-established hypothesis;

hypotheses generating means for generating a plurality of additional hypotheses, one hypothesis comprising a false alarm hypothesis including only the previously-established data segments, one hypothesis comprising an augmented hypothesis including only the newly-received data sample representing a hypothesis that the newly-received data sample is a first data sample for a new data segment, probability score generating means for generating a probability value for each updated hypothesis generated by the hypotheis update means and each new hypothesis generating means; and iteration control means for controlling said sample prediction means, said sample probability means, said thesis update means, said hypothesis generating means and said probability score generating means through a plurality of iterations each for each newly-received data sample.

3. A system as defined in claim 2 in which said sample prediction means includes Kalman filter means for generating said prediction series.

4. A system as defined in claim 2 in which said sample probability means includes residual value generating means for generating a normalized squared residual value between the newly-received data sample and said expected data sample value for each data segment, the sample probability means generating said likelihood value for each data segment in response to the normalized squared residual value for each data segment.

5. A system as defined in claim 1 in which said probability score generating means includes raw likelihood score generating means for generating a raw likelihood score $P(H_i/n+1)$ for each original hypothesis $H_i$ as $$P(H_i/n+1) = P(H_i/n) \left[ \left( 1 - \prod_{j=1}^{K} 1 - P_a(S_j) \right) (1-P_n)(1-P_{FA}) + P_N(1-P_{FA}) + P_{FA} \right],$$

where "$S_j$" represents each segment associated with the hypothesis, "$P_N$" represents the a priori likelihood that the new data item starts a new segment, "$P_{FA}$" represents the a priori likelihood that new data item is a "false alarm," that is, that it does not belong to any segment, and "K" is the number of segments $S_j$ associated with hypothesis $H_i$, updated hypothesis generating means for generating a likelihood score $P(H_{ij})$ for each hypothesis $H_{ij}$ representing the likelihood that segment $S_j$ associated with the hypothesis is updated with the newly-received data item as $$P(H_{ij}) = P(H_i/n+1) \frac{\left[ 1 - \prod_{j=1}^{K} (1 - P_a(S_j)) \right] (1 - P_{FA}) \frac{P_a(S_j)}{1 - P_a(S_j)}}{\sum_{j=1}^{K} (1 - P_a(S_j))};$$

a likelihood score $P(H_{iN})$ for the augmented hypothesis $H_{iN}$ as:

$$P(H_{iN}) = P(H_i/n+1) \left[ \prod_{j=1}^{K} (1 - P_a(S_j)) \right] (1 - P_{FA});$$

and the likelihood score $P(H_{iFA})$ for false-alarm hypothesis $H_{iFA}$ as $$P(H_{iFA}) = P(H_i/n+1) P_{FA}.$$

6. A system as defined in claim 2 in which said probability score generating means further includes pruning means for eliminating hypotheses whose probability values are below a predetermined threshold value.

7. A system as defined in claim 1 in which said trajectory selection means includes grid search means for performing a grid search operation in connection with hypotheses generated by said hypothesis update means and hypothesis generating means.

* * * * *

UNITED STATES PATENT AND TRADEMARK OFFICE
CERTIFICATE OF CORRECTION

PATENT NO. : 5,471,433

DATED : 28 November 1995

INVENTOR(S) : SHERRY E. HAMMEL ET AL

It is certified that error appears in the above-identified patent and that said Letters Patent is hereby corrected as shown below:

Title page, item [19] change "Hammell et al" to read ––Hammel et al––

TITLE PAGE, ITEM [75]

Change "Sherry E. Hammell" to ––Sherry E. Hammel––.

Signed and Sealed this

Twenty-sixth Day of March, 1996

Attest:

BRUCE LEHMAN

Attesting Officer

Commissioner of Patents and Trademarks